United States Patent [19]

Ozue et al.

[11] Patent Number: 5,287,341
[45] Date of Patent: Feb. 15, 1994

[54] ROTATING OPTICAL HEAD APPARATUS

[75] Inventors: Tadashi Ozue; Yoshiteru Kamatani; Takuya Kaeriyama, all of Kanagawa, Japan

[73] Assignee: Sony Corporation, Tokyo, Japan

[21] Appl. No.: 842,546

[22] Filed: Feb. 27, 1992

[30] Foreign Application Priority Data

Mar. 1, 1991 [JP] Japan ................... 3-036237

[51] Int. Cl.$^5$ ........................... G11B 3/74
[52] U.S. Cl. ................... 369/97; 369/44.18; 360/107
[58] Field of Search .......... 369/97, 44.14, 44.18, 369/44.19, 44.17; 360/130.22, 130.24, 84, 87, 85, 130.23, 107

[56] References Cited

U.S. PATENT DOCUMENTS

| | | | |
|---|---|---|---|
| 4,366,516 | 12/1982 | Ogata et al. | 360/130.24 |
| 4,525,757 | 6/1985 | Imanishi et al. | 360/130.24 |
| 4,595,961 | 6/1986 | Kuwajima | 360/130.24 |
| 4,641,214 | 2/1987 | Imanishi et al. | 360/130.24 |
| 4,719,528 | 1/1988 | Sato | 360/130.24 |
| 4,807,213 | 2/1989 | Chung et al. | 369/97 |
| 5,041,937 | 8/1991 | Saito | 360/130.24 |
| 5,060,104 | 10/1991 | Kitaori et al. | 360/130.24 |
| 5,063,555 | 11/1991 | Miyoshi et al. | 369/97 |

Primary Examiner—W. R. Young
Assistant Examiner—Nabil Hindi
Attorney, Agent, or Firm—Lewis H. Eslinger; Jay H. Maioli

[57] ABSTRACT

A rotating intermediate drum having mounted thereon optical head is made smaller than stationary upper and lower drums in diameter and spiral grooves are formed on the rotating intermediate drum on its surfaces opposing the stationary upper and lower drums. An optical tape is transported in a floated condition relative to a drum circumferential surface owing to a synergy of a dynamic pressure based on the rotation of the rotating intermediate drum and the air exhausted from the spiral grooves. Therefore, an information signal is recorded on and/or reproduced from the optical tape when the optical tape is transported in the floated condition from the head drum having the trilayer structure composed of the stationary upper and lower drums and the rotating intermediate drum therebetween.

2 Claims, 3 Drawing Sheets

ROTATING OPTICAL HEAD APPARATUS

BACKGROUND OF THE INVENTION

1. Field of the Invention

The present invention generally relates to optical head apparatus and, more particularly, to a rotating optical head apparatus for use with an optical recording and/or reproducing apparatus which employs an optical tape as a recording medium.

2. Description of the Related Art

In accordance with the development of technology in which an optical tape is employed as an optical recording medium, an optical recording and/or reproducing apparatus has been proposed, in which an optical head is mounted within a rotating drum and the rotating drum is rotated while the optical tape helically wrapped around the circumferential surface of the rotating drum by a predetermined wrapping angle is being transported, thereby a desired information being optically recorded and reproduced.

This optical recording and/or reproducing apparatus employs the helical scan system, i.e., the system in which a scanning locus of an optical beam emitted from the optical head mounted within the rotating drum is sequentially and obliquely formed with respect to the transport direction of the optical tape, whereby an information can be optical recorded on and reproduced from the scanning locus.

When the optical tape wrapped around the rotating drum is transported and the information is optically recorded and reproduced by the optical head, the optical tape must be transported on the rotating drum stably and smoothly To this end, such a technique is proposed, in which a layer of air, i.e., so-called air film is formed between the transport surface (circumferential surface) of the rotating drum and the tape surface and the tape is transported under the condition that the tape is floated on the circumferential surface of the rotating drum.

According to the above-mentioned technique, the rotating drum is formed to have a bilayer structure in which an upper drum is formed as a rotating drum having a head and a lower drum is formed as a stationary drum for guiding the tape. Then, the rotating drum is rotated at high speed to supply the air into the spacing between the circumferential surface of the drum and the tape to thereby form the air film. In order to maintain the air film amount (thickness of the air film), such a proposal is also made, in which a spiral groove of pump-out type is formed on one of the opposing surfaces of the rotating drum and the stationary drum and the air is blown out from the spiral groove by the rotation of the rotating drum to thereby increase the air pressure relative to the tape.

However, according to the aforesaid structure, while the tape is in the floated state relative to the rotating drum under the condition that the tape is transported in the stationary state (transported in the forward (FWD) mode) upon recording and reproducing, in the non-stationary state transport (search mode or the like), the tape comes in contact with the rotating drum. There is then the risk that the tape will be damaged.

OBJECTS AND SUMMARY OF THE INVENTION

In view of the aforesaid drawbacks encountered with the prior art, it is an object of the present invention to provide a rotating optical head apparatus in which the aforesaid shortcomings and disadvantages of the prior art can be eliminated.

It is another object of the present invention to provide a rotating optical head apparatus in which a tape can be prevented from being brought in contact with a rotating member having an optical head during the transport.

It is a further object of the present invention to provide a rotating optical head apparatus which can prevent a tape from being damaged.

It is a further object of the present invention to provide a rotating optical head apparatus for use with an optical recording and reproducing apparatus which employs an optical tape as a recording medium.

In accordance with an aspect of the present invention, a rotating optical head apparatus is comprised of a pair of stationary drums disposed on the same axis with a predetermined spacing therebetween in the axial direction, and a rotating member disposed between the stationary drums and having an optical head to record and/or reproduce an information signal, wherein the rotating member and the pair of stationary drums have surfaces opposing to each other with a very small distance and spiral grooves of pump-out type for exhausting air in an inside space to the outside are provided on both surfaces of the rotating member opposing the very small spacing or on end faces of the pair of stationary drums.

The above and other objects, features, and advantages of the present invention will become apparent in the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described with reference to the accompanying drawings. In this case, the present invention is applied to an optical recording and/or reproducing apparatus in which a desired information is optical recorded on and reproduced from a tape-shaped optical recording medium (hereinafter referred to as an optical tape).

Figure 1:
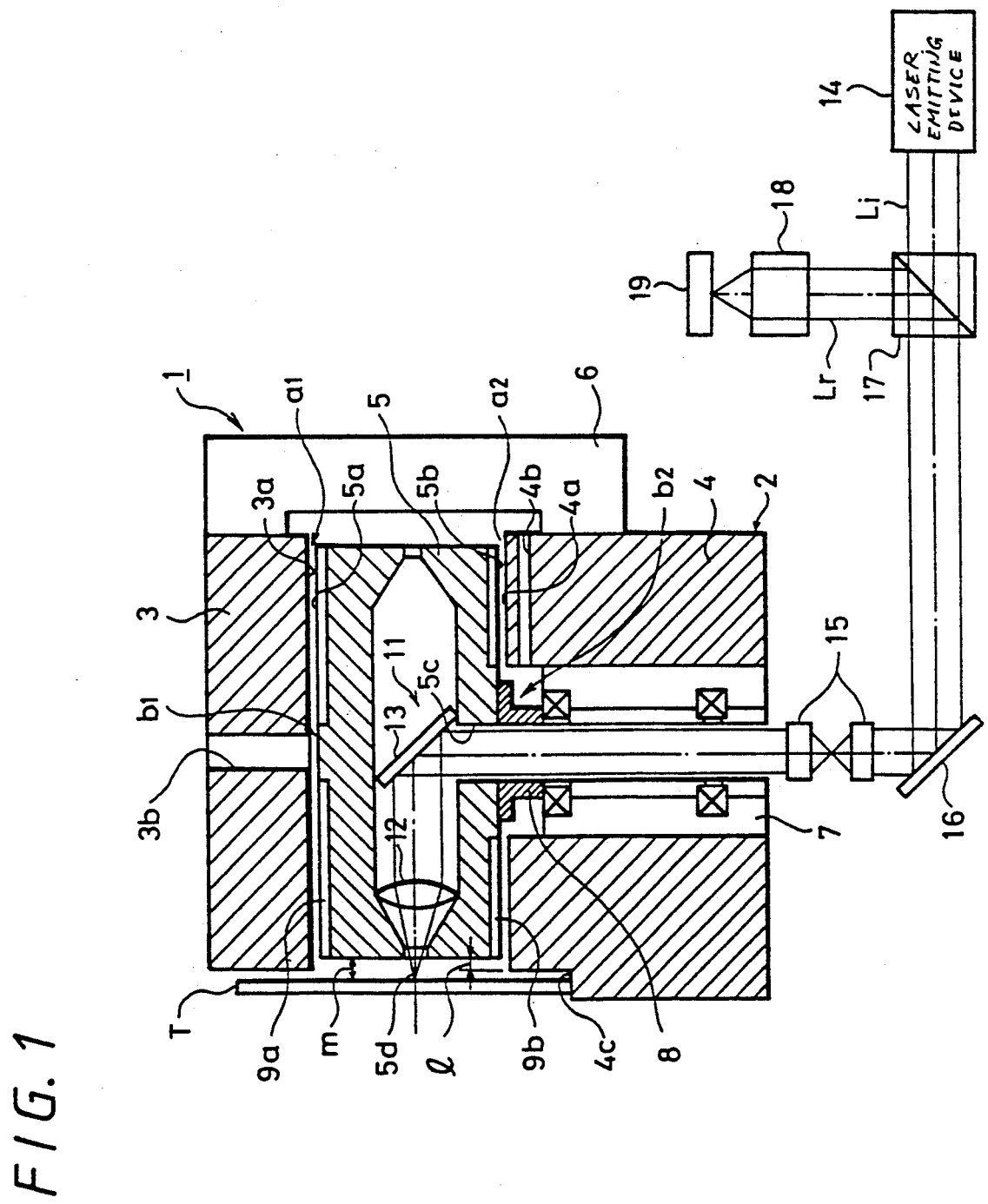
FIG. 1 is a schematic cross-sectional view illustrating an embodiment of a rotating optical head apparatus according to the present invention.

In FIG. 1, reference numeral 1 generally depicts a rotating optical head apparatus for an optical recording and/or reproducing apparatus. Reference numeral 2 depicts a head drum having an optical head mounted thereon and for guiding the transport of an optical tape T wrapped therearound, and this head drum 2 is formed as a trilayer structure which comprises a stationary upper drum 3, a stationary lower drum 4 and a rotating intermediate drum 5.

The stationary upper and lower drums 3 and 4 of the head drum 2 are the same in diameter and are coupled on their rear surface side by a coupling member 6 such that a lower surface 3a and an upper surface 4a are respectively opposed to upper and lower surfaces 5a and 5b of the rotating intermediate drum 5 with predetermined spacings $a_1$ and $a_2$. The rotating intermediate drum 5 is formed to be smaller than the stationary upper and lower drums 3 and 4 in outer diameter by a predetermined length 1 and coupled to the rotating unit of a motor 7 housed within the central portion of the stationary lower drum 4 in the axial direction at the circumferential surface of a central opening portion 5c of the lower surface 5b by a hollow compling member 8.

An optical head 11 is mounted on the rotating intermediate drum 5. This optical head 11 comprises an objective lens 12 located on the inside of a window aperture 5d formed on the circumferential surface of the rotating drum 3 and a reflecting mirror 13 disposed on the rotating central axis of the rotating drum 5 in an opposing relation to the objective lens 12 at an angle of 45 degrees. In order to allow a light beam Li emitted from a laser emitting device 14 to become incident on the optical head 11, a relay lens 15 and a galvano mirror 16 are disposed between the reflecting mirror 13 and the laser emitting device 14. Also, a polarizing beam splitter 17 is disposed between the laser emitting device 14 and the galvano mirror 16 in order to introduce a reflected-back light beam Lr, which travels along the optical path of the light beam Li in the opposite direction from the laser emitting device 14, into a photodetector 19 through a condenser lens 18.

Figure 2:
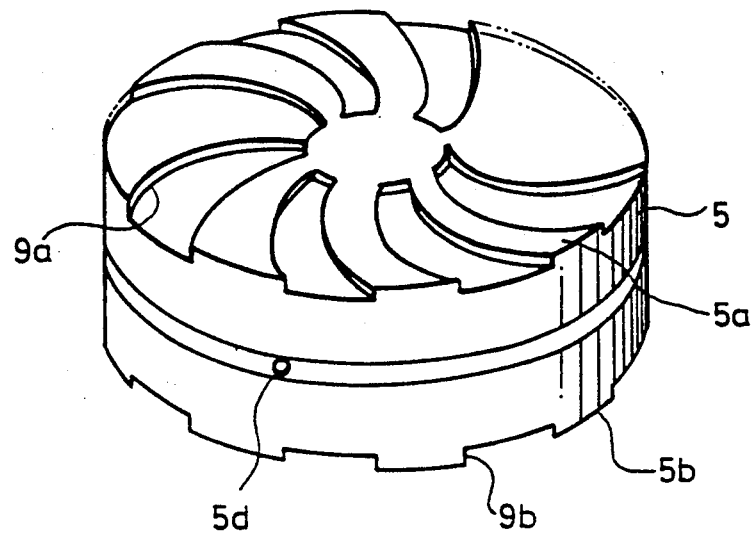
FIG. 2 is a schematic perspective view of a rotating drum used in the rotating optical head apparatus shown in FIG. 1.

Spiral grooves 9a and 9b are respectively formed on the upper and lower surfaces 5a and 5b of the rotating intermediate drum 5 as shown in FIG. 2 and the rotating intermediate drum 5 is rotated by the motor 7, whereby the air, which is taken in inner spacings $b_1$ and $b_2$ between the rotating intermediate drum 5 and the stationary upper and lower drums 3 and 4 through vent holes 3b and 4b formed through the stationary drums 3 and 4, is exhausted from the spiral grooves 9a and 9b in the outer circumferential direction. Further, the air flow along the outer circumferential surface of the rotating intermediate drum 5 takes place due to the of the rotating intermediate drum 5. This air flow proceeds within groove portions formed by the outer circumferential surface of the rotating intermediate drum 5 and the outer circumferential edge surfaces of the lower surface 3a and the upper surface 4a of the stationary upper and lower drums 3 and 4 because the outer circumferential surface of the rotating intermediate drum 5 is located inside of the outer circumferential surfaces of the stationary upper and lower drums 3 and 4.

In the rotating optical head apparatus 1 of the optical recording and/or reproducing apparatus thus arranged, when the optical tape T is helically wrapped around the head drum 2 across the stationary upper and lower drums 3 and 4 along a guide edge 4c of the stationary lower drum 4, transported and the rotating intermediate drum 5 is rotated, then the air flow takes place on the circumferential surface of the rotating intermediate drum 5 and the air, which is taken in the inner spacings $b_1$ and $b_2$ between the rotating intermediate drum 5 and the stationary upper and lower drums 3 and 4 via the vent holes 3b and 4b, is exhausted from the spiral grooves 9a and 9b formed on the upper and lower surfaces 5a and 5b of the rotating intermediate drum 5.

Owing to a synergy of the air flow and the exhausted air, an air pressure between the circumferential surface of the rotating intermediate drum 5 and the optical tape T is increased to float the optical tape T even from the circumferential surfaces of the stationary upper and lower drums 3 and 4, thereby the optical tape T being transported smoothly in a non-contact state. Also, the optical tape T can be prevented from being worn.

The light beam Li emitted from the optical head 11 is converged on the recording surface of the optical tape T thus transported through the window aperture 5d of the rotating intermediate drum 5, whereby recording tracks are formed on the optical tape T obliquely with respect to the transport direction of the optical tape T. Thus, a desired optical information can be recorded by modulating the light beam Li with an information signal.

Also, the light beam Li is radiated on the recording surface of the optical tape T and the resultant reflected-back light Lr is traveled through the optical path of the light beam Li in the reverse direction and introduced from the polarizing beam splitter 17 through the condenser lens 18 into the photodetector 19 and then detected, thereby the optical information recorded on the optical tape T being reproduced.

According to the above-mentioned arrangement, by selecting a difference l of diameters between the stationary upper and lower drums 3, 4 and the rotating intermediate drum 5 to be less than a predetermined value, the optical tape T can be supported by a dynamic pressure provided by the air flow occurred between the tape T and the outer circumferential surface of the rotating intermediate drum 5, i.e., the air film, whereby a spacing m between the optical tape T and the rotating intermediate drum 5 is made constant.

That is, if the tension of the optical tape T, the diameter of the rotating intermediate drum 5, the rotational speed thereof and the exhausting pressure of air from the spiral grooves 9a, 9b are constant, then the spacing m between the optical tape T and the rotating intermediate drum 5 becomes constant.

Accordingly, if the rotating intermediate drum 5 is not correctly rotated, i.e., rotated in a displaced fashion, then the focal position of the light beam Li relative to the optical tape T also is moved. As a consequence, the displacement of the focus of the light beam Li due to the vibrating rotation of the rotating intermediate drum 5 is reduced. Therefore, if the slow focusing fluctuation due to mainly the tension fluctuation of the optical tape T or the like is followed by the focusing servo system composed of the relay lens 15, then it is possible to constantly converge the light beam Li on the optical tape T reliably.

According to experimental results, it is desired that a value of difference l of the diameters of the stationary upper and lower drums 3, 4 and the rotating intermediate drum 5 is selected to be less than 2R/1000 in order to make the spacing m between the optical tape T and the rotating intermediate drum 5 constant, that is, in order to produce a constant air film where R is the radius of the rotating intermediate drum 5.

Figure 3:
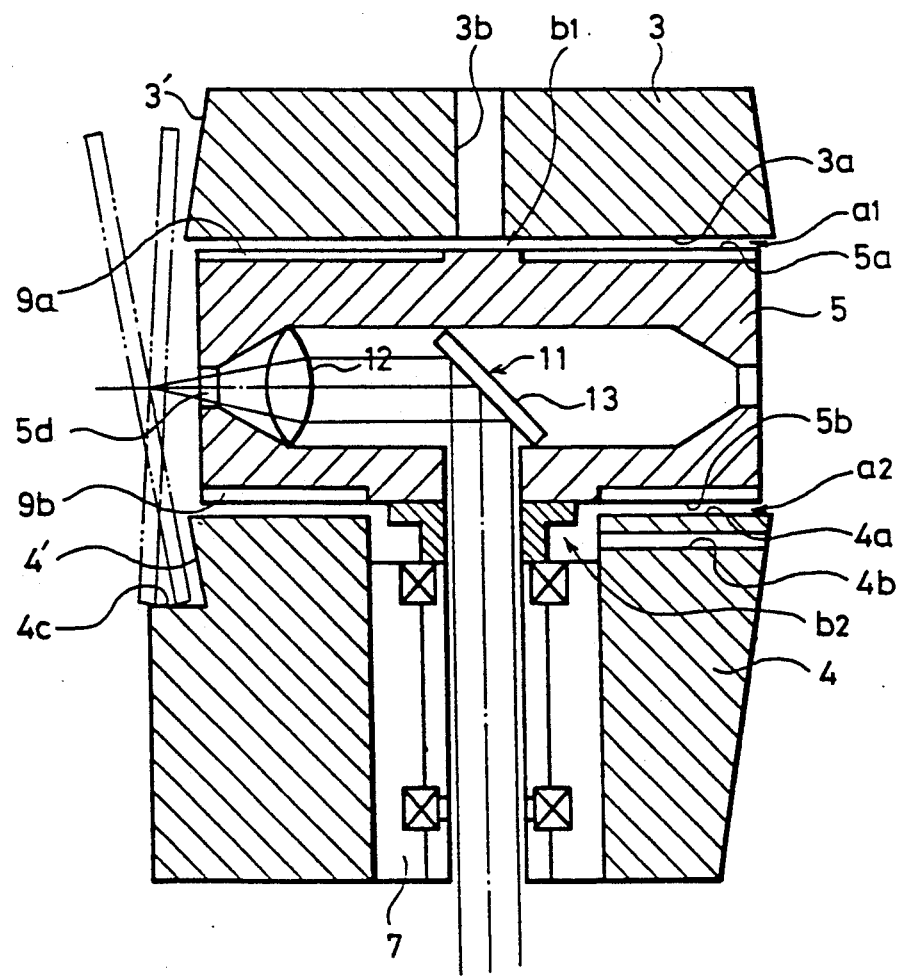
FIG. 3 is a schematic cross-sectional view illustrating another embodiment of the rotating optical head apparatus according to the present invention.

Further, according to the above-mentioned arrangement, if the stationary upper and lower drums 3 and 4 are tapered from the opposing surfaces 3a and 4a thereof to the rotating intermediate drum 5 to the other end face direction, that is, the stationary upper drum 3 is tapered in the upper direction to provide a tapered portion 3' and the stationary lower drum 4 is tapered in the lower direction to provide a tapered portion 4', then the contact of the rotating intermediate drum 5 with the optical tape T can be implemented more effectively. In other words, the optical tape T is supported at its intermediate portion corresponding to the rotating intermediate drum 5 by the synergy of the dynamic pressure based on the air flow brought about by the rotation of the rotating intermediate drum 5 and the exhausting pressure of air from the spiral grooves 9a and 9b. In this case, although the optical tape T is unstably supported at its upper and lower portions corresponding to the stationary upper and lower drums 3 and 4 by the air pressure (air film) (see a one-dot chain line and a two-dot chain line in FIG. 3) so that the optical tape T tends to contact the circumferential surface of the stationary upper drum 3 or the stationary lower drum 4, if the stationary upper and lower drums 3 and 4 are formed as the tapered portions 3' and 4' as described before, then the spacing between the stationary upper and lower drums 3 and 4 and the optical tape T can be maintained, thereby the optical tape T being held in the non-contact state.

Further, although the tape tension cannot be controlled without difficulty when the optical tape T is transported in the fast forward mode, in the rewind mode or in the stop mode, the dynamic pressure and the air exhausting pressure are increased by rotating the rotating intermediate drum 5 at speed higher than the normal speed, whereby the floating amount of the optical tape T is increased to isolate the optical tape T from the circumferential surfaces of the stationary upper and lower drums 3 and 4 reliably.

As described above, even when the rotating intermediate drum 5 having the optical head 11 mounted thereon is rotated at high speed, the high speed search becomes possible because this optical recording and/or reproducing apparatus is provided with a tracking mechanism.

Figure 4:
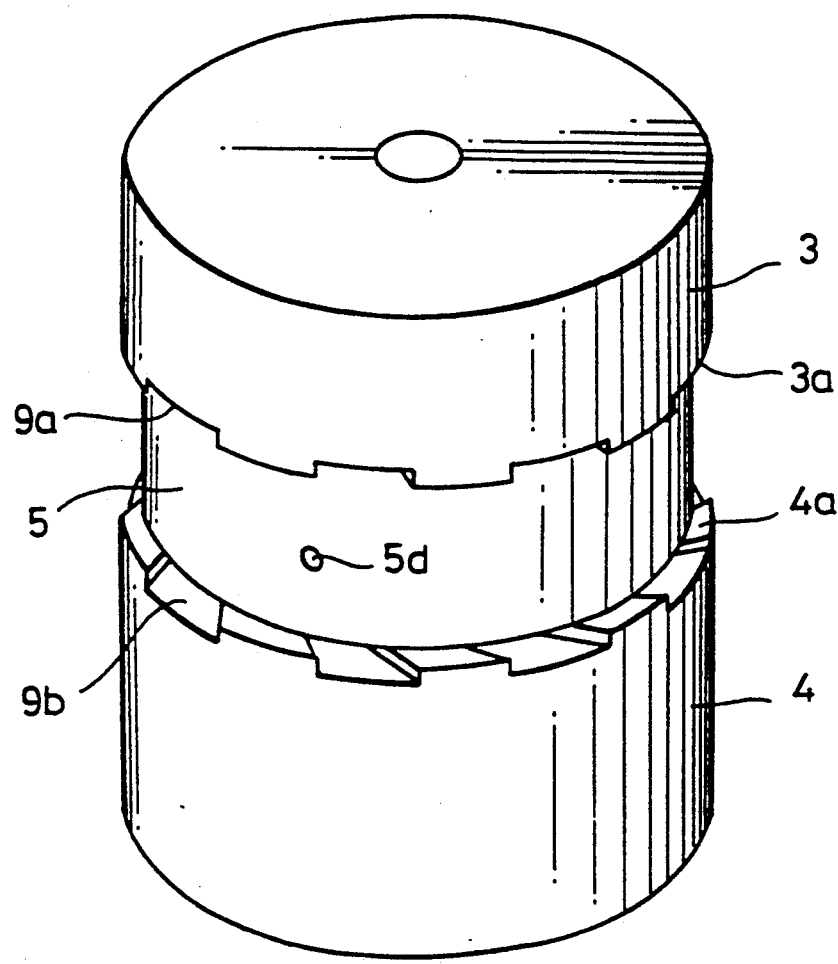
FIG. 4 is a schematic perspective view illustrating another example of the rotating head drum used in the rotating optical head apparatus shown in FIG. 3.

While the spiral grooves 9a and 9b are respectively formed on the upper and lower surfaces 5a and 5b of the rotating intermediate drum 5 opposing the lower surface 3a and the upper surface 4a of the stationary upper and lower drums 3 and 4 in the head drum 2 formed as the trilayer structure as described above, the spiral grooves 9a and 9b are respectively formed on the lower surface 3a of the stationary upper drum 3 and the upper surface 4a of the stationary lower drum 4 as shown in FIG. 4.

Also in this case, by the rotation of the rotating intermediate drum 5, the air in the inside spacings is exhausted from the spiral grooves 9a and 9b on the stationary upper and lower drums 3 and 4 and due to the synergy of the air exhaust pressure and the dynamic pressure based on the air flow produced by the rotation of the rotating intermediate drum 5, the optical tape T wrapped around the head drum 2 is transported in the condition such that it is floated from the stationary upper and lower drums 3 and 4 as well as the rotating intermediate drum 5. Therefore, similarly as earlier noted, the optical tape T can be smoothly transported in the normal transport mode and in the high speed transport mode and also the optical tape T can be prevented from being worn.

When the spiral grooves 9a and 9b are formed on the intermediate drum 5 side and when the spiral grooves 9a and 9b are formed on the stationary upper and lower drum 3 and 4 side, the air in the inside spacing is exhausted from the spiral grooves 9a and 9b by the rotation of the rotating intermediate drum 5. In this case, the air is exhausted only from the trough portions of the spiral groove 9a and 9b so that the air layer on the drum circumferential surface is inflated at its portion corresponding to the air exhausting portion to the outside, thereby the air layer is in the corrugated state on the whole. Accordingly, when the spiral grooves 9a and 9b are formed on the stationary upper and lower drums 3 and 4, then the position of the air exhausting portion is fixed so that the air on the drum circumferential surface, i.e., the air film between the optical tape T and the stationary upper and lower drums 3 and 4 is formed in the fixed corrugated state. As a consequence, the optical tape T is transported along the aforesaid air film in a corrugated fashion with the result that the focal length of the optical head 11 mounted on the rotating intermediate drum 5 relative to the optical tape T is considerably fluctuated, thus the load on the focusing servo system being increased.

On the other hand, when the spiral grooves 9a and 9b are formed on the rotating intermediate drum 5 as earlier noted, then the position of the air exhausting portion is moved by the rotation of the rotating intermediate drum 5 so that the air layer on the drum circumferential surface is uniform, thereby the air film between the optical tape T and the rotating intermediate drum 5 is substantially the same in thickness. As a consequence, the shape of the optical tape T becomes constant as seen from the optical head 11, whereby the fluctuation of the focal length is reduced and the load on the focusing servo system also is reduced. Therefore, the recording and reproduction can be carried out more reliably.

From these reasons, it is desired that the spiral grooves 9a and 9b, which exhaust the air in the inside spacing of the head drum 2 to the outer circumference side, are formed on the rotating intermediate drum 5 side.

As described above, according to the above-mentioned embodiments, since the rotating intermediate drum 5 of the head drum 2 having mounted thereon the optical head 11 in the optical recording and/or reproducing apparatus is formed to be smaller than the stationary upper and lower drums 3 and 4 in diameter and is rotated under the condition that it is withdrawn from the outer circumferential surfaces of the stationary upper and lower drums 3 and 4, the optical tape T can be transported while it is set in the completely non-contact state relative to the rotating intermediate drum 5. Further, the difference of diameters between the stationary upper and lower drums 3, 4 and the rotating intermediate drum 5 falls within the range in which the rotating intermediate drum 5 gives the air film effect to the optical tape T and the optical tape T is supported by the air film. Also, the spiral grooves 9a and 9b are formed on one of the opposing surfaces of the stationary upper and lower drums 3 and 4 with respect to the rotating intermediate drum 5 and the optical tape T is floated from the outer circumferential surfaces of the stationary upper and lower drums 3 and 4 by the air exhausted from the spiral grooves 9a and 9b. Therefore, the transport of the optical tape T in the non-contact condition relative to the head drum 2 can be realized.

Further, since the floating amount of the tape is increased by the rotating intermediate drum 5 at higher speed in the fast forward mode and in the rewind mode of the optical tape T so that the optical tape T can be transported while it is in the completely non-contact state relative to the head drum 2. Also, the stationary upper and lower drums 3 and 4 are tapered in the opposite direction relative to the rotating intermediate drum 5, so that even in the normal transport mode, the tape T can be transported while in the completely non-contact state relative to the head drum 2.

Furthermore, the fluctuation of the floating amount of the optical tape T due to the fluctuation of tension of the optical tape T can be corrected by the focusing servo system, thereby the recording and/or reproducing being effected reliably.

The rotating intermediate drum 5 having mounted thereon the optical head 11 may be formed as a cylindrical surface. That is, the window aperture 5d through which the light beam on the optical axis of the objective lens travels is formed only on the portion opposing the objective lens 12 as a through-hole or as a slit-shaped aperture over the whole periphery of the rotating intermediate drum 5 and a glass is filled into the above through-hole or the slit-shaped aperture, thereby the rotating intermediate drum 5 being formed as the cylindrical surface.

The number of the spiral grooves, the width of grooves, cross-sectional area of grooves and so on may be varied in accordance with drum diameter, rotational speed of the rotating drum or the like. Also, the cross-sectional shape of the groove may be modified in a wide variety of shapes such as V-letter shape, U-letter shape and so on.

As described above, according to the present invention, since the diameter of the rotating member provided between the pair of stationary drums and having the optical head is selected to be smaller than those of two stationary drums and spiral grooves of the pump-out type for exhausting the air in the inside spacing to the outside are formed on both surfaces of the rotating member in an opposing relation to the very small spacing between the rotating member and the two stationary drums or on the opposing end faces of the two stationary drums, the tape-shaped recording medium wrapped around the two stationary drums can be transported in the non-contact state relative to the rotating member which is rotated at high speed. Also, the tape-shaped recording medium is given the air film effect by the air exhausted from the spiral grooves and thus transported in the floated state from the two stationary drums. As a consequence, this tape-shaped recording medium can be transported smoothly and stably and can also be prevented from being worn. Therefore, the recording and reproduction can constantly be carried out reliably by the use of the optical head mounted on the rotating member.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A rotating optical head apparatus comprising:
   a pair of upper and lower stationary drums disposed on the same axis with a predetermined spacing therebetween in the axial direction; and
   a rotating member disposed between said stationary drums and having an optical head to record and/or reproduce an information signal, wherein a diameter of said rotating member is selected to be smaller than those of said pair of stationary drums, said rotating member and said pair of stationary drums have surfaces opposing each other with a very small spacing and spiral grooves of a pump-out type for exhausting air in an inside space to the outside are formed on upper and lower surfaces of said rotating member opposing said very small spacing, wherein said upper stationary drum is tapered such that its diameter is continuously reduced in the upward direction and said lower stationary drum is tapered such that its diameter is continuously reduced in the downward direction.

2. A rotating optical head apparatus according to claim 1, wherein a difference between the diameter of said rotating member and that of said upper and lower stationary drums is smaller than $2R/1000$ where R is a radius of said rotating member.

* * * * *